(12) United States Patent
Keil et al.

(10) Patent No.: US 6,672,436 B1
(45) Date of Patent: Jan. 6, 2004

(54) VARIABLE BLEED ORIFICE VALVING

(75) Inventors: Daniel Keil, Temperance, MI (US); Timothy Bombrys, Bowling Green, OH (US); Karl Kazmirski, Toledo, OH (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 0 days.

(21) Appl. No.: 09/552,125

(22) Filed: Apr. 19, 2000

(51) Int. Cl.[7] .............................. F16F 9/34; F16F 9/348
(52) U.S. Cl. .............................. 188/322.14; 188/282.5; 188/282.4
(58) Field of Search ................ 188/322.14, 322.15, 188/322.13, 322.19, 282.5, 282.6, 282.8, 283, 316, 317, 319.1, 280, 282.4, 297

(56) References Cited

U.S. PATENT DOCUMENTS

| | | | | |
|---|---|---|---|---|
| 2,320,697 A | * | 6/1943 | Binder | 188/88 |
| 3,088,556 A | * | 5/1963 | de Carbon | 188/88 |
| 3,945,474 A | * | 3/1976 | Palmer | 188/322 |
| 3,981,380 A | | 9/1976 | Andre | |
| 4,076,276 A | * | 2/1978 | Wijnhoven et al. | 280/714 |
| 4,113,072 A | * | 9/1978 | Palmer | 188/282 |
| 4,203,507 A | * | 5/1980 | Tomita et al. | 188/282.9 |
| 4,232,767 A | | 11/1980 | De Kock | |
| 4,297,920 A | * | 11/1981 | Richter | 74/804 |
| 4,478,387 A | * | 10/1984 | Postema | 251/121 |
| 4,624,347 A | * | 11/1986 | Mourray | 188/322.15 |
| 4,819,773 A | | 4/1989 | Ito et al. | |
| 4,830,152 A | | 5/1989 | Rauert et al. | |
| 4,895,229 A | | 1/1990 | Kato | |
| 4,899,855 A | * | 2/1990 | de Carbon | 188/322.15 |
| 4,905,799 A | * | 3/1990 | Yamaoka et al. | 188/322.15 |
| 4,907,680 A | * | 3/1990 | Wolfe et al. | 188/299 |
| 4,923,038 A | * | 5/1990 | Lizell | 188/299 |

(List continued on next page.)

FOREIGN PATENT DOCUMENTS

| | | | |
|---|---|---|---|
| DE | 4139746 A1 | * | 6/1993 |
| JP | 1269740 A1 | * | 10/1989 |
| JP | 3168429 A1 | * | 7/1991 |
| JP | 3168429 A | * | 7/1991 |
| JP | 3168431 A1 | * | 7/1991 |

*Primary Examiner*—Matthew C. Graham
*Assistant Examiner*—Melody M. Burch
(74) *Attorney, Agent, or Firm*—Harness, Dickey & Pierce, PLC

(57) ABSTRACT

A shock absorber includes a valve assembly with a low speed oil flow circuit and a mid/high speed oil flow circuit. Both circuits control fluid flow through the valve assembly in the same direction. The low speed oil flow circuit is tunable in order to provide low speed damping to improve both the vehicle control and handling. The tuning of the low speed oil flow circuit is accomplished by supporting a low speed valve disc at a position radially inward of its outer edge to control the rate at which the low speed oil flow circuit opens. The valve assembly of the present invention can be located within either a base valve assembly or a piston valve assembly.

3 Claims, 6 Drawing Sheets

U.S. PATENT DOCUMENTS

| | | | |
|---|---|---|---|
| 4,964,493 A | * 10/1990 | Yamaura et al. | 188/280 |
| 4,972,929 A | * 11/1990 | Ivers et al. | 188/322.15 |
| 5,042,624 A | * 8/1991 | Furuya et al. | 188/280 |
| 5,064,032 A | * 11/1991 | Ashiba | 188/299 |
| 5,085,300 A | 2/1992 | Kato et al. | |
| 5,115,892 A | 5/1992 | Yamaoka et al. | |
| 5,150,775 A | 9/1992 | Charles et al. | |
| 5,180,186 A | 1/1993 | Charles et al. | |
| 5,251,927 A | 10/1993 | Charles et al. | |
| 5,293,971 A | 3/1994 | Kanari et al. | |
| 5,316,113 A | * 5/1994 | Yamaoka | 188/282 |
| 5,325,942 A | * 7/1994 | Groves et al. | 188/282 |
| 5,333,708 A | * 8/1994 | Jensen et al. | 188/322.14 |
| 5,413,195 A | 5/1995 | Murakami | |
| 5,497,862 A | 3/1996 | Hoya | |
| 5,529,154 A | * 6/1996 | Tanaka | 188/280 |
| 5,595,269 A | 1/1997 | Beck | |
| 5,706,919 A | 1/1998 | Kruckemeyer et al. | |
| 5,738,190 A | 4/1998 | Deferme | |
| 5,769,192 A | 6/1998 | Beck | |
| 5,823,306 A | 10/1998 | de Molina | |
| 5,937,976 A | 8/1999 | Grundei | |
| 6,116,388 A | * 9/2000 | Bataille et al. | 188/282.6 |
| 6,382,372 B1 | * 5/2002 | Keil et al. | 188/322.14 |

* cited by examiner

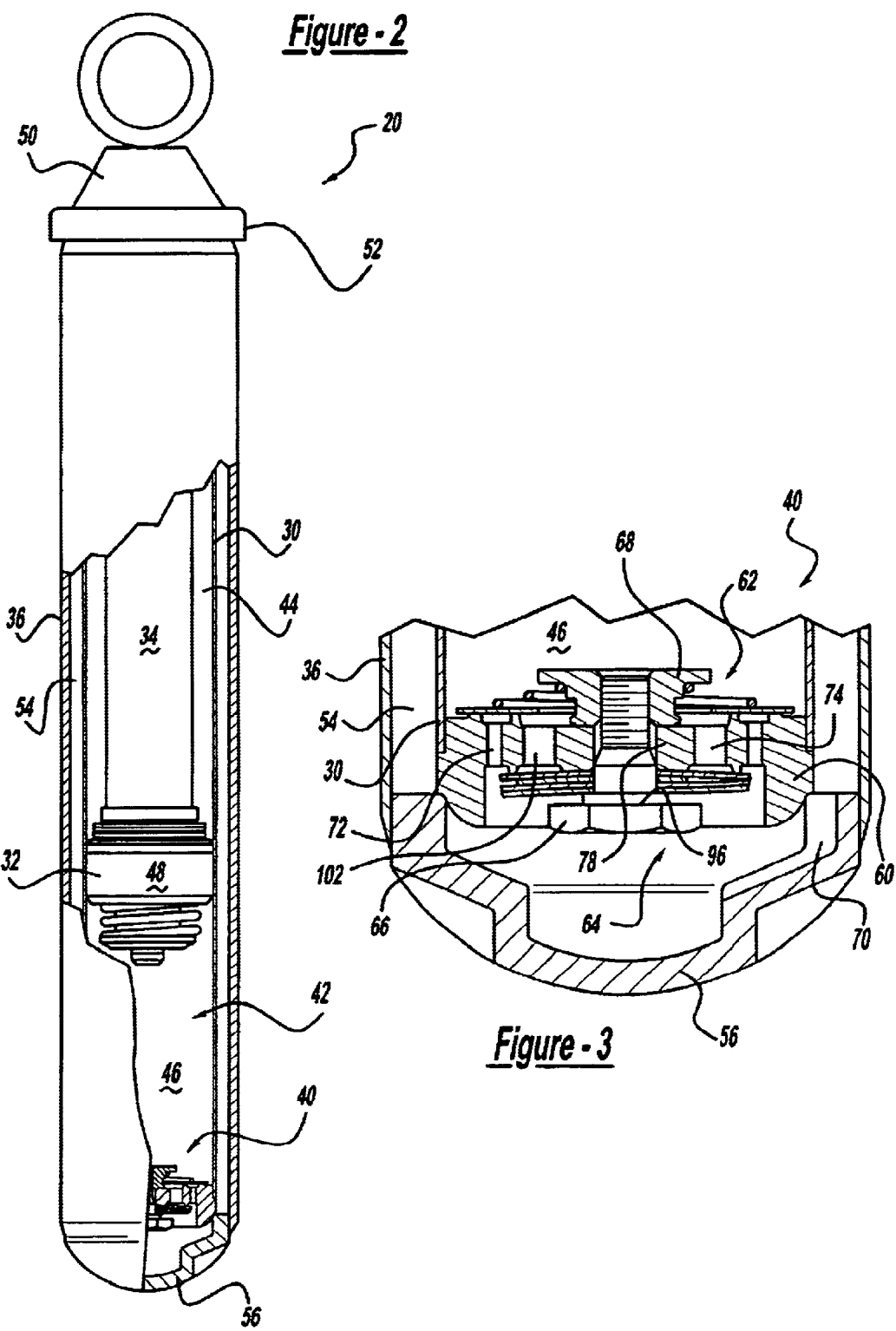

VARIABLE BLEED ORIFICE VALVING

FIELD OF THE INVENTION

The present invention relates generally to automotive dampers or shock absorbers which receive mechanical shock. More particularly, the present invention relates to a unique hydraulic valve assembly which allows greater tunability of the shock absorber, especially in the mode of low hydraulic fluid flow.

BACKGROUND OF THE INVENTION

Shock absorbers are used in conjunction with automotive suspension systems to absorb unwanted vibrations which occur during driving. To absorb these unwanted vibrations, shock absorbers are generally connected between the sprung portion (body) and the unsprung portion (suspension) of the automobile. A piston is located within a pressure tube of the shock absorber, with the piston being connected to the sprung portion of the automobile through a piston rod and the pressure tube being connected to the unsprung portion of the automobile. Because the piston is able, through valving, to limit the flow of damping fluid between opposite sides of the piston, when the shock absorber is compressed or extended, the shock absorber is able to produce a damping force which counteracts the unwanted vibration which would otherwise be transmitted from the unsprung portion to the sprung portion of the automobile. In a dual tube shock absorber, a fluid reservoir is defined between the pressure tube and the reservoir tube. A base valve can be located between the lower working chamber (the area below the piston) and the reservoir to limit the flow of fluid between the lower working chamber and the reservoir to produce a damping force which also counteracts the unwanted vibration which would otherwise be transmitted from the unsprung portion to the sprung portion of the automobile. The greater the degree to which the flow of fluid within the shock absorber is restricted by the piston and/or the base valving, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant of the main springs of the vehicle as well as the spring constant of the seat, tires and the damping coefficient of the shock absorber. For optimum ride comfort, a relatively low damping force or a soft ride is preferred.

Vehicle handling is related to the variation in the vehicle's attitude (i.e., roll, pitch and yaw). For optimum vehicle handling, relatively large damping forces, or a firm ride, are required to avoid excessively rapid variations in the vehicle's attitude during cornering, acceleration and deceleration.

Finally, road holding ability is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed to generate the desired damping forces in relation to the various vehicle performance characteristics. Shock absorbers have been developed to provide different damping characteristics depending on the speed at which the piston moves within the pressure tube. Because of the exponential relation between pressure drop and flow rate, it is a difficult task to obtain a damping force at relatively low piston velocities, particularly at velocities near zero. Low speed damping force is important to vehicle handling since most vehicle handling events are controlled by low speed vehicle body velocities.

Various prior art systems for tuning shock absorbers during low speed movement of the piston create a fixed low speed bleed orifice which provide a bleed passage which is always open across the piston. This bleed orifice can be created by utilizing orifice notches positioned either on the flexible disc adjacent to the sealing land or utilizing orifice notches directly in the sealing land itself. In order to obtain the low speed control utilizing these open orifice notches, the orifice notches have to be small enough to create a restriction at relatively low velocities. When this is accomplished, the low speed fluid circuit of the valving system will operate over a very small range of velocity. Therefore, the secondary or high-speed stage valving is activated at a lower velocity than is desired. Activation of the secondary valving at relatively low velocities creates harshness. Harshness is created because the shape of the fixed orifice bleed circuit force velocity characteristic is totally different than the shape of the high-speed circuit.

Continued development of shock absorbers include the development of a valving system which can provide a smooth transition between a low speed valving circuit and the secondary valving or high speed valving circuit. The smooth transition between these two circuit will help to reduce and/or eliminate any harshness during the transition.

SUMMARY OF THE INVENTION

The present invention provides the art with a method for tuning damping forces at low piston velocities in order to improve the handling characteristics of the vehicle without creating harshness. The present invention provides a variable orifice bleed circuit which is incorporated into the secondary valving system. The secondary valving system includes a plurality of discs secured to the piston to close the fluid passages extending through the piston. The plurality of discs deflect due to a pressure differential to open the fluid passages during the second stage valving. The variable orifice bleed circuit of the present invention incorporates a smaller diameter valve disc directly adjacent the valve disc which contacts the piston. This smaller diameter disc allows the outer circumferential portion of the valve disc in contact with the piston to deflect prior to the deflection of the stack of valve discs to provide the variable orifice bleed circuit. In one embodiment, the reduced diameter disc is concentric with the other valve discs, in another embodiment it is eccentric to the other valve discs and in one other embodiment the reduced diameter disc includes a contoured surface to control the deflection of the other valve discs.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a side view, partially in cross-section of a shock absorber incorporating the variable bleed orifice in accordance with the present invention;

FIG. 3 is an enlarged side elevational view, partially in cross-section, of the base valve assembly for the shock absorber shown in FIG. 2;

DETAILED DESCRIPTION OF THE PREFERRED EMBODIMENT

Figure 1:
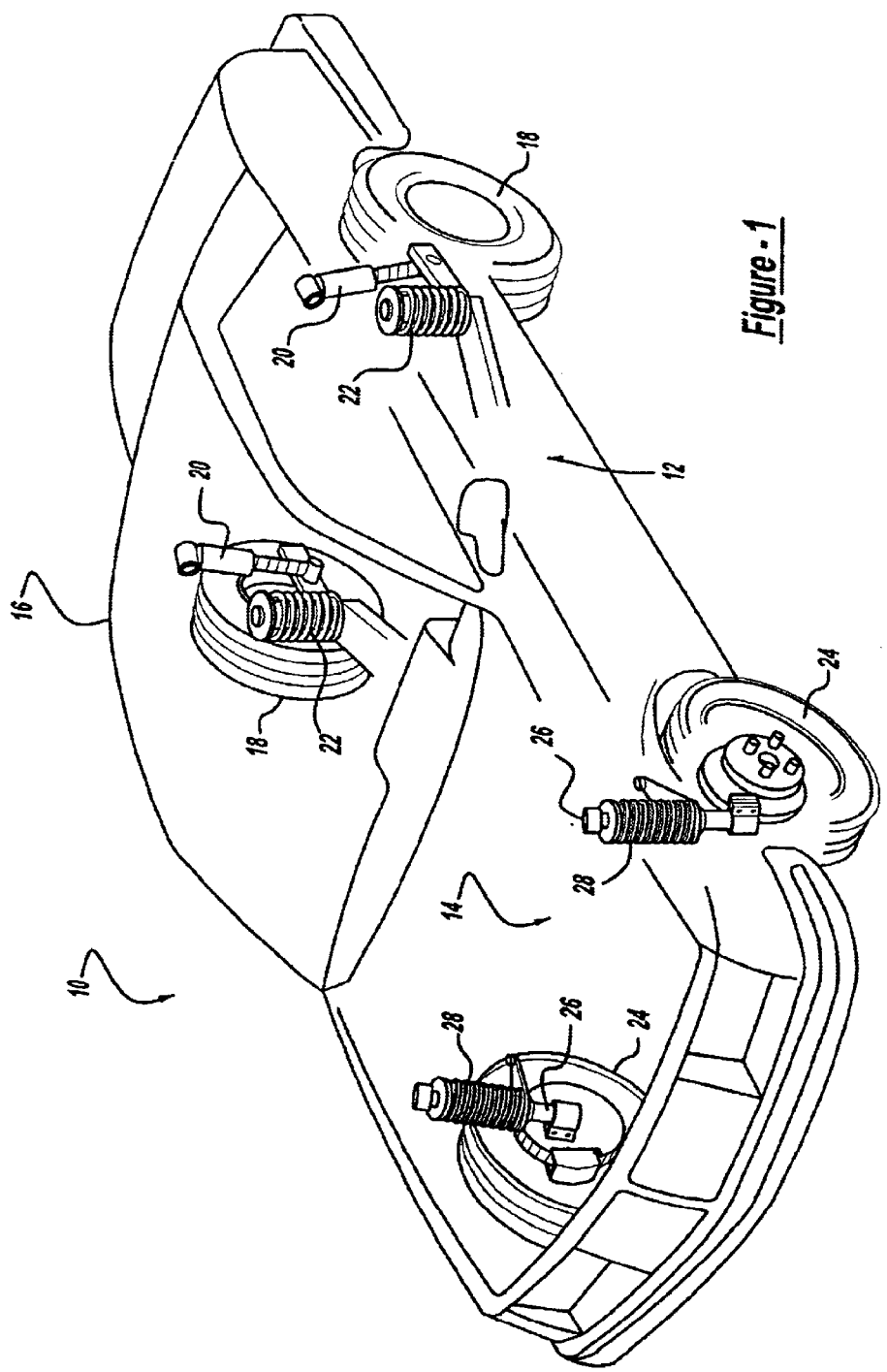
FIG. 1 is an illustration of an automobile using the variable bleed orifice in accordance with the present invention.

Referring now to the drawings in which like reference numerals designate like or corresponding parts throughout the several views, there is shown in FIG. 1 a vehicle incorporating a suspension system having the variable bleed orifice in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a second pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include McPherson struts.

Referring now to FIG. 2, shock absorber 20 is shown in greater detail. While FIG. 2 shows only shock absorber 20, it is to be understood that shock absorber 26 also includes the variable bleed orifice valving in accordance with the present invention described below for shock absorber 20. Shock absorber 26 differs from shock absorber 20 in the way in which it is adapted to be connected to the sprung and unsprung portions of vehicle 10. Shock absorber 20 comprises a pressure tube 30, a piston 32, a piston rod 34, a reservoir tube 36 and a base valve assembly 40.

Pressure tube 30 defines a working chamber 42. Piston 32 is slidably disposed within pressure tube 30 and divides working chamber 42 into an upper working chamber 44 and a lower working chamber 46. A seal 48 is disposed between piston 32 and pressure tube 30 to permit sliding movement of piston 32 with respect to pressure tube 30 without generating undue frictional forces as well as sealing upper working chamber 44 from lower working chamber 46. Piston rod 34 is attached to piston 32 and extends through upper working chamber 44 and through an upper end cap 50 which closes the upper end of both pressure tube 30 and reservoir tube 36. A sealing system 52 seals the interface between upper end cap 50, pressure tube 30, reservoir tube 36 and piston rod 34. The end of piston rod 34 opposite to piston 32 is adapted in the preferred embodiment, to be secured to the sprung portion of vehicle 10. Valving in piston 32 controls the movement of fluid between upper working chamber 44 and lower working chamber 46 during movement of piston 32 within pressure tube 30. Because piston rod 34 extends only through upper working chamber 44 and not lower working chamber 46, movement of piston 32 with respect to pressure tube 30 causes a difference in the amount of fluid displaced in upper working chamber 44 than the amount of fluid displaced in lower working chamber 46. This difference in the amount of fluid displaced is known as the "rod volume" and it flows through base valve assembly 40.

Reservoir tube 36 surrounds pressure tube 30 to define a reservoir chamber 54 located between the tubes. The bottom end of reservoir tube 36 is closed by an end cap 56 which is adapted, in the preferred embodiment, to be connected to the unsprung portion of vehicle 10. The upper end of reservoir tube 36 is attached to upper end cap 50. Base valve assembly 40 is disposed between lower working chamber 46 and reservoir chamber 54 to control the flow of fluid between the two chambers. When shock absorber 20 extends in length (rebound), an additional volume of fluid is needed in lower working chamber 46 due to the "rod volume" concept. Thus, fluid will flow from reservoir chamber 54 to lower working chamber 46 through base valve assembly 40. When shock absorber 20 compresses in length (compression), an excess volume of fluid must be removed from lower working chamber 46 due to the "rod volume" concept. Thus, fluid will flow from lower working chamber 46 to reservoir chamber 54 through base valve assembly 40.

The present invention is directed to a unique base valve assembly 40 which includes variable bleed orifice valving in accordance with the present invention. Base valve assembly 40 provides a tunable smooth transition between the low speed compression valving and the second stage of compression valving which comes into play during mid and high speed piston movements.

Referring now to FIG. 3, base valve assembly 40 comprises a valve body 60, a rebound valve assembly 62, a compression valve assembly 64, a retaining bolt 66 and a retaining nut 68. Valve body 60 is secured to pressure tube 30 and end cap 56 by press fitting or by other methods known well in the art. End cap 56 is secured to reservoir tube 36 and it defines a plurality of fluid passages 70 which allow communication between reservoir chamber 54 and base valve assembly 40. Valve body 60 defines a plurality of rebound fluid passages 72, a plurality of compression fluid passages 74 and a central bore 78. Retaining bolt 66 extends through central bore 78 and threadingly engages retaining nut 68 to secure both rebound valve assembly 62 and compression valve assembly 64 to valve body 60.

Figure 4:
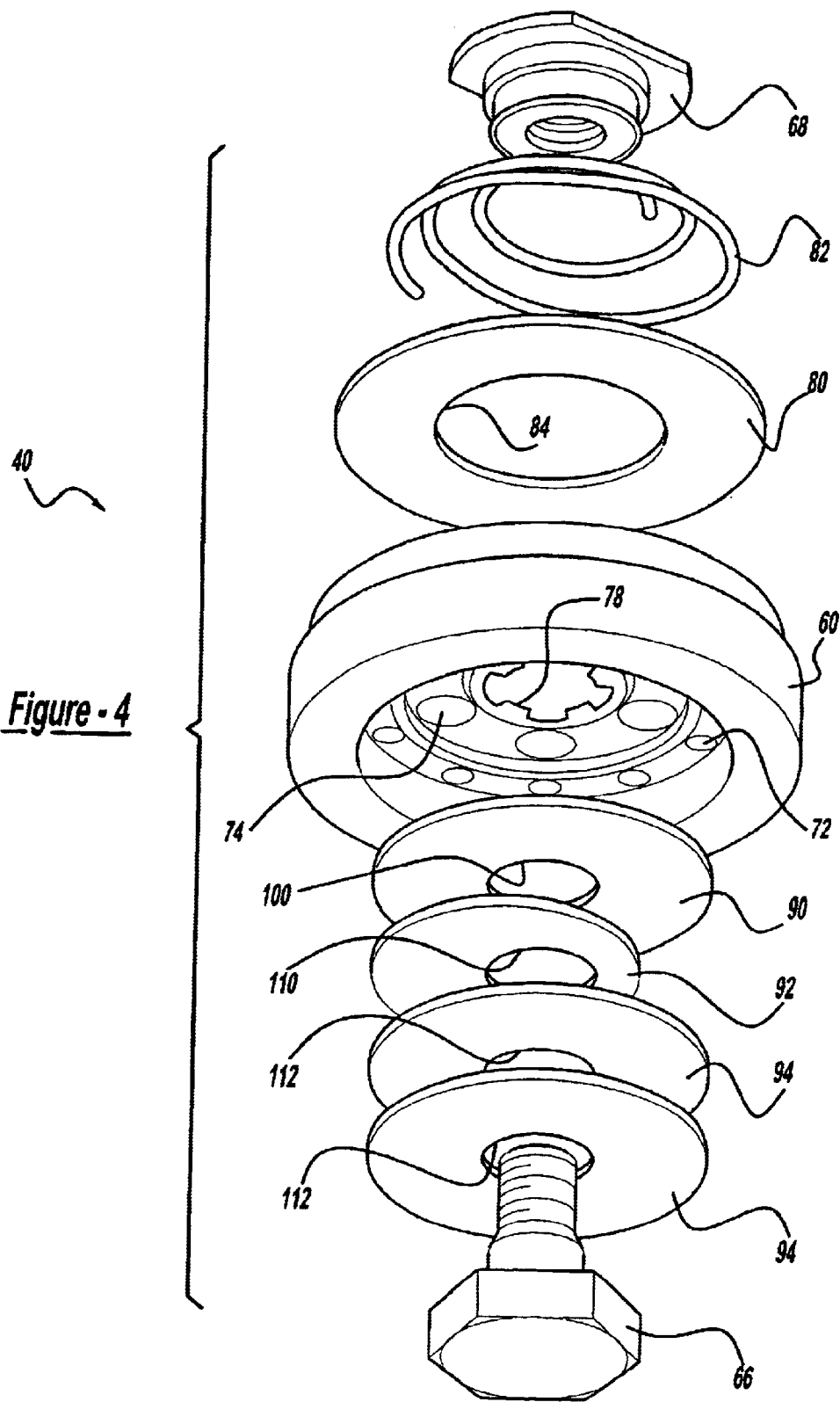
FIG. 4 is an exposed perspective view of the base valve assembly shown in FIG. 3.

Referring now to FIGS. 3 and 4, rebound valve assembly 62, a pressure valve, comprises a valve disc 80 and a valve spring 82. Valve disc 80 is an annular member which defines an internal bore 84 for allowing fluid flow to compression fluid passages 74 as described below. Valve disc 80 is biased against the upper surface of valve body 60 by valve spring 82 which is located between valve disc 80 and retaining nut 68. Valve disc 80 closes the plurality of rebound passages 72. During a rebound or extension stroke of shock absorber 20, fluid pressure decreases in lower working chamber 46 until the fluid pressure within reservoir chamber 54 and within passages 72 is capable of overcoming the biasing of valve spring 82. When the biasing force of valve spring 82 is exceeded by fluid pressure acting against valve disc 80, valve disc 80 is moved away from valve body 60 to allow fluid flow from reservoir chamber 54 to lower working chamber 46.

Compression valve assembly 64 comprises a variable orifice bleed disc 90, a supporting disc 92 and one or more mid/high speed valve discs 94. Discs 90, 92 and 94 are stacked together and located adjacent to valve body 60 with variable orifice bleed disc 90 abutting valve body 60, supporting disc 92 abutting variable orifice bleed disc 90 and mid/high speed valve disc 94 abutting supporting disc 92. Discs 90, 92 and 94 are held in position by being sandwiched between a shoulder 96 located on retaining bolt 66 and the lower surface of valve body 60. Retaining bolt 66 is secured to valve body 60 by retaining nut 68.

The variable orifice bleed disc 90 is an annular disc defining a central bore 100 through which bolt 66 extends. Disc 90 is sized to define an annular chamber 102 and to close the plurality of compression passages 74 but allow fluid access to the plurality of rebound passages 72. When fluid pressure builds up in annular chamber 102 and in passages 74, disc 90 will flex allowing for the bleed flow of fluid past disc 90. As shown in FIGS. 3 and 4, the central axis of annular chamber 102 is coaxial with the central axis of valve body 60.

Supporting disc 92 is an annular disc defining an eccentrically located bore 110 through which bolt 66 extends. The eccentric position of bore 110 provides support for variable orifice bleed disc 90 at varying radial distances in order to provide the variable bleed characteristics for compression valve assembly 64 as is further detailed below.

The mid/high speed valve disc 94 is an annular disc having a central bore 112 through which bolt 66 extends. Central bore 112 centers mid/high speed valve disc 94 on retaining bolt 66. Discs 94 covers disc 92 and when sufficient fluid pressure builds up in passages 74, discs 94 will flex to allow full flow of fluid past discs 90, 92 and 94.

Figure 6:
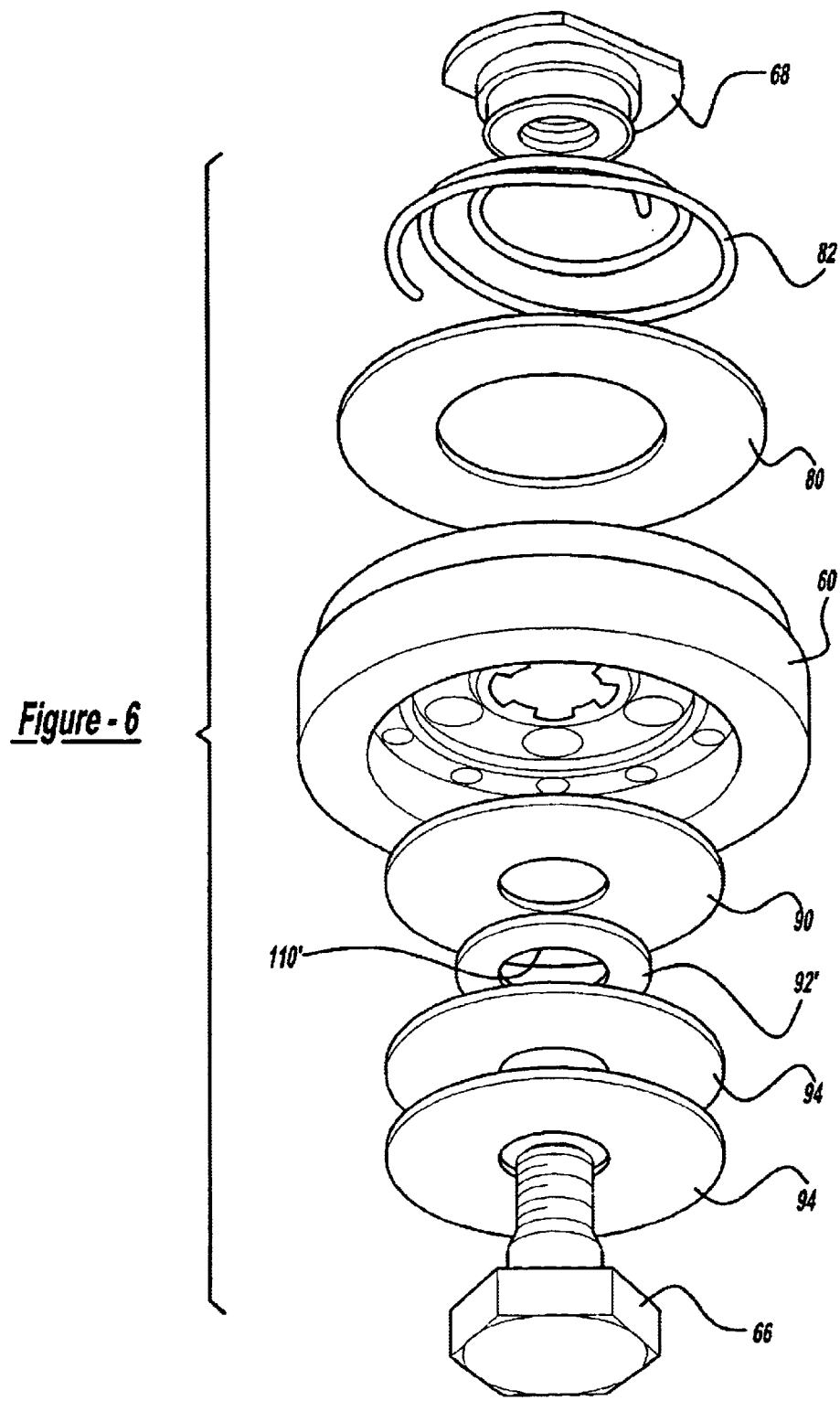
FIG. 6 is a perspective view of a base valve assembly having a valve disc for use in a variable bleed orifice in accordance with another embodiment of the present invention.
Figure 7:
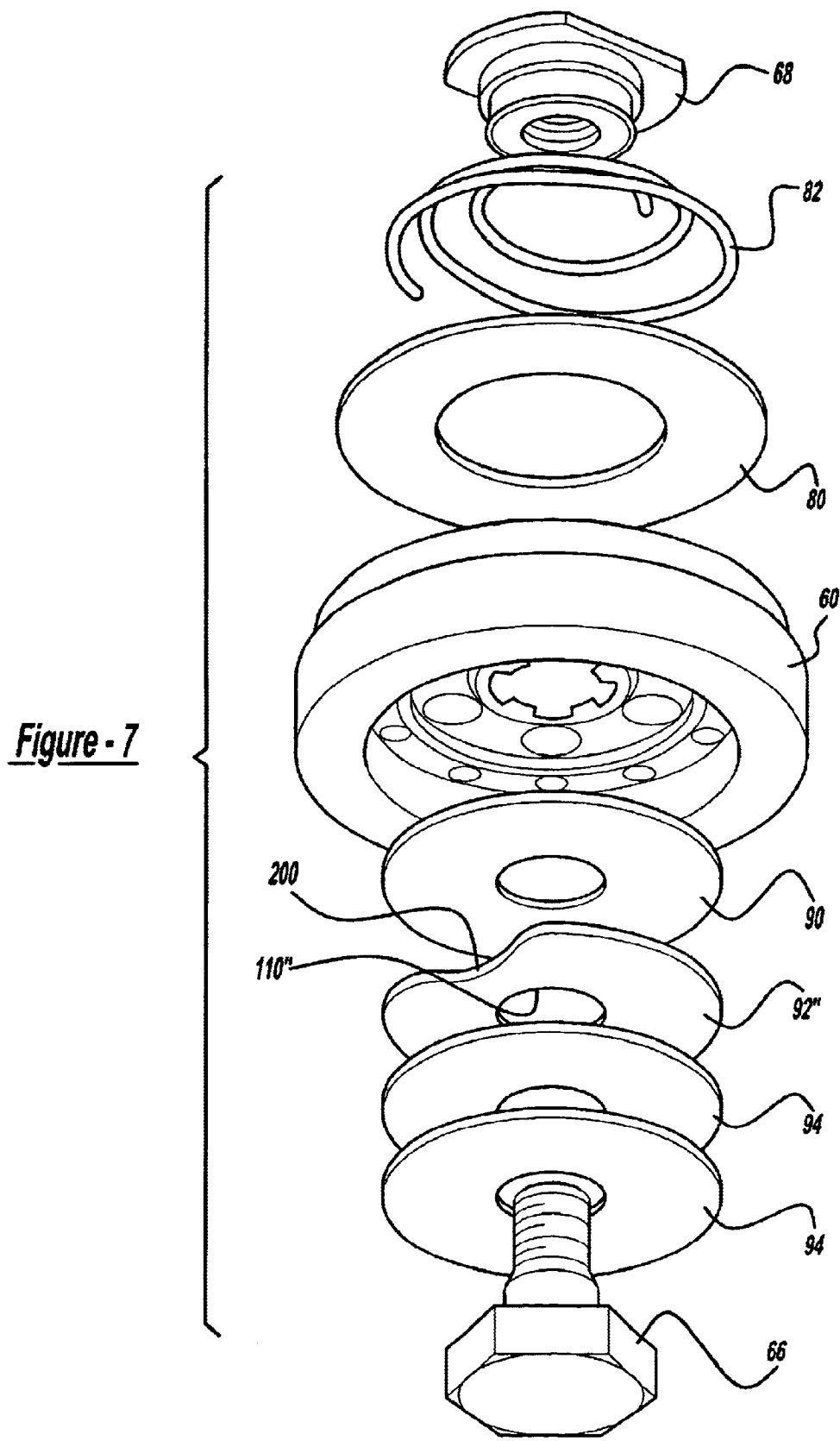
FIG. 7 is a perspective view of a base valve assembly having a valve disc for use in a variable bleed orifice in accordance with another embodiment of the present invention.

During a compression stroke, fluid pressure builds up in lower working chamber 46 and fluid pressure decreases in upper working chamber 44. The increase in pressure in lower working chamber 46 causes a pressure imbalance between lower working chamber 46 and reservoir chamber 54 and compression passages 74. This pressure imbalance within passages 74 will react against variable orifice bleed disc 90 causing disc 90 to deflect to allow fluid flow past disc 90. The pressure difference between lower working chamber 46 and reservoir chamber 54 required to cause deflection of disc 90 will be determined by the bending stiffness of disc 90 and the radial positioning of support for disc 90 by supporting disc 92. As the fluid pressure difference continues to increase, disc 90 will deflect more allowing additional flow of fluid past disc 90. The shape of the pressure differential vs. flow curve will be determined by the shape of the outer circumferential edge of supporting disc 92. FIGS. 3 and 4 illustrate an eccentric supporting disc 92 which will provide a specific variable flow rate past disc 90. FIG. 6 illustrates a supporting disc 92' which has a centrally located bore 110'. Disc 92' is smaller in diameter than disc 90 thus providing a pressure differential vs. flow curve which is different than that provided by disc 92. FIG. 7 illustrates a supporting disc 92" which has an offset bore 110" and a contoured outer edge 200 which is shaped to provide a specific pressure differential vs. flow curve.

As the fluid pressure differential continues to increase, the load exerted on variable orifice bleed disc 90 will be transferred to mid/high speed disc 94 to eventually cause the deflection of discs 94 allowing for full flow of fluid through compression valve assembly 64.

Thus, the present invention provides increased low speed damping force which enhances vehicle control. Vehicle handling is improved as a result of transferring the inertia of the vehicle to a force applying the tire to the road. The amount of force transferred by shock absorber 20 can be tuned to meet specific vehicle performance criteria. Prior art designs cannot transfer vehicle body inertia to the tire because a damping force is not created at low velocities due to the fixed bleed orifices or notches. The present invention is a distinct advantage over the prior art systems since the low speed valving is a tunable feature.

Figure 5:
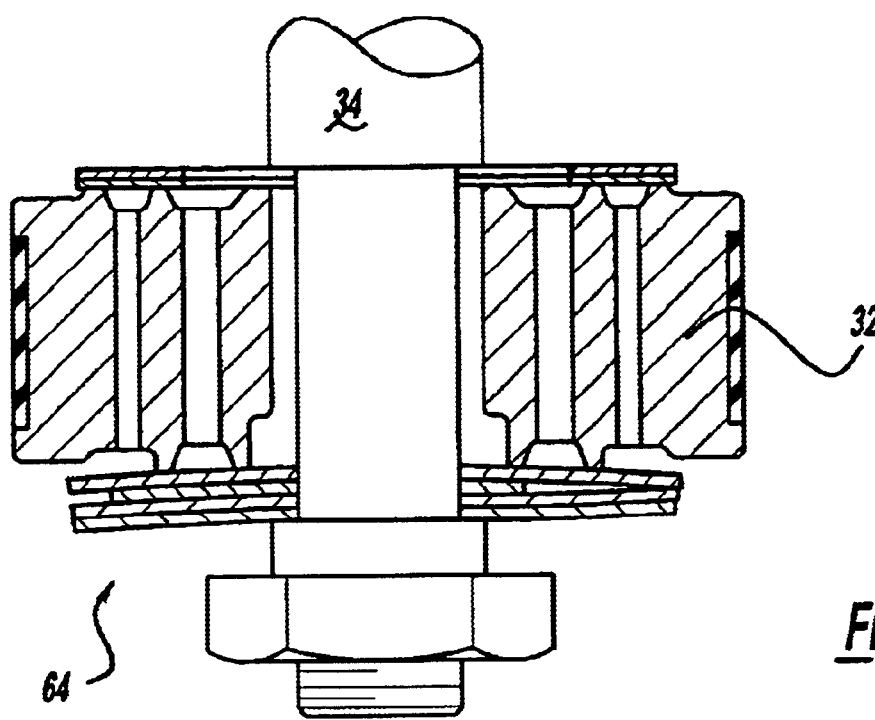
FIG. 5 is an enlarged side elevational view, partially in cross-section of a piston assembly incorporating the variable bleed orifice in accordance with the present invention.

While the present invention has been illustrated in conjunction with base valve assembly 40, it is within the scope of the present invention, as shown in FIG. 5, to incorporate compression valve assembly 64 on either side of piston 32 if desired.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
   a pressure tube forming a working chamber;
   a piston disposed within said working chamber, said piston dividing said working chamber into an upper working chamber and a lower working chamber;
   a reservoir tube disposed around said pressure tube, said reservoir tube forming a reservoir chamber between said pressure tube and said reservoir tube;
   a base valve assembly disposed between said lower working chamber and said reservoir chamber for regulating flow of damping fluid in a first direction between said lower working chamber and said reservoir chamber, said base valve assembly comprising:
   a valve body defining a central bore defining a central axis;
   a low speed compression valve movable between a closed position and an open position, said low speed compression valve including a first generally planar compression valve disc disposed adjacent said valve body to define a first annular chamber between said valve body and said first generally planar compression valve disc, said first generally planar compression valve disc having an outside edge defining an outside diameter and said first generally planar compression valve disc defining a central bore defining a central axis coaxial with said central axis of said valve body, said low speed compression valve further including a second planar compression valve disc having an outer edge which provides a pivot edge for said first generally planar compression valve disc at a position between said outside edge and said central axis of said first generally planar compression valve disc, said second planar compression valve disc having a bore defining an axis eccentric to said central axis of said valve body;

a mid/high speed compression valve movable between a closed position and an open position, said mid/high speed compression valve including a third generally planar compression valve disc supporting said second planar compression valve disc, said third compression valve disc having an outside edge defining an outside diameter, said outside diameter of said third compression valve disc being generally equal to said outside diameter of said first compression valve disc, said third compression valve disc not being in contact with said valve body, said third generally planar compression valve disc defining a central bore defining a central axis coaxial with said central axis of said valve body;

a retaining bolt extending through said central bore of said third compression valve disc, said bore of said second compression valve disc, said central bore of said first compression valve disc and said central bore of said valve body to retain said first, second and third compression valve discs to said valve body;

a retaining nut threadingly engaging said retaining bolt;

a generally planar rebound valve disc disposed adjacent a second side of said valve body to define a second annular chamber between said valve body and said rebound valve disc, and for closing said second fluid passage, said rebound valve disc defining a central bore defining a central axis coaxial with said central axis of said valve body, said retaining bolt extending through said central axis of said rebound valve disc; and a coil spring disposed between said retaining nut and said rebound valve disc to bias said rebound valve disc towards said valve body.

2. The damper according to claim 1, wherein said outer edge of said second planar compression valve disc is a circular outer edge.

3. The damper according to claim 1, wherein said outer edge of said second planar compression valve disc is a contoured shaped outer edge.

* * * * *